United States Patent
Sima (10) Patent No.: US 8,566,945 B2
(45) Date of Patent: Oct. 22, 2013

(54) SYSTEM AND METHOD FOR TESTING WEB APPLICATIONS WITH RECURSIVE DISCOVERY AND ANALYSIS

(75) Inventor: Caleb Sima, Woodstock, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2575 days.

(21) Appl. No.: 11/056,928

(22) Filed: Feb. 11, 2005

(65) Prior Publication Data

US 2005/0251863 A1   Nov. 10, 2005

Related U.S. Application Data

(60) Provisional application No. 60/543,626, filed on Feb. 11, 2004.

(51) Int. Cl.
| G06F 11/00 | (2006.01) |
| G06F 12/14 | (2006.01) |
| G06F 12/16 | (2006.01) |
| G08B 23/00 | (2006.01) |

(52) U.S. Cl.
USPC ............. 726/25; 726/4; 726/5; 726/6; 726/7; 726/23; 726/24; 726/27; 726/34; 713/151; 713/152; 713/168; 713/183; 713/188; 713/192; 713/193; 709/203; 709/225; 709/219; 714/37; 714/39

(58) Field of Classification Search
USPC ............................................. 726/25; 725/25
See application file for complete search history.

(56) References Cited

U.S. PATENT DOCUMENTS

| 5,032,979 | A  | 7/1991  | Hecht |
| 5,485,409 | A  | 1/1996  | Gupta |
| 5,812,763 | A  | 9/1998  | Teng |
| 5,850,516 | A  | 12/1998 | Schneier |
| 5,892,903 | A  | 4/1999  | Klaus |
| 5,931,946 | A  | 8/1999  | Terada |
| 6,088,804 | A  | 7/2000  | Hill |
| 6,185,689 | B1 | 2/2001  | Todd, Sr. et al. |
| 6,205,551 | B1 | 3/2001  | Grosse |
| 6,205,552 | B1 | 3/2001  | Fudge |
| 6,263,444 | B1 | 7/2001  | Fujita |
| 6,269,447 | B1 | 7/2001  | Maloney |
| 6,282,546 | B1 | 8/2001  | Gleichauf |
| 6,298,445 | B1 | 10/2001 | Shostack |
| 6,301,668 | B1 | 10/2001 | Gleichauf |
| 6,321,338 | B1 | 11/2001 | Porras |

(Continued)

OTHER PUBLICATIONS

Sima et al., Office Action dated Apr. 29, 2008, U.S. Appl. No. 11/461,766, 12 p.

(Continued)

Primary Examiner — Nathan Flynn
Assistant Examiner — Bryan Wright (57) ABSTRACT

A recursive web crawling and analysis tool that includes conducting an initial crawl of a target to identify testable or analyzable objects. The objects are then parsed to identify vulnerabilities, as well as additional objects that can be analyzed. An attack is then launched against the analyzable objects in an effort to break or verify the vulnerabilities. During this attack, additional analyzable objects may be discovered. If such additional objects are discovered, the web crawler is invoked on the additional objects as well, and the results of the crawl are fed back into the parser and attacker functions.

19 Claims, 7 Drawing Sheets

(56) References Cited

U.S. PATENT DOCUMENTS

| | | |
|---|---|---|
| 6,338,141 B1 | 1/2002 | Wells |
| 6,484,262 B1 | 11/2002 | Herzi |
| 6,499,107 B1 | 12/2002 | Gleichauf |
| 6,535,227 B1 | 3/2003 | Fox |
| 6,546,493 B1 | 4/2003 | Magdych |
| 6,550,012 B1 | 4/2003 | Villa |
| 6,574,737 B1 | 6/2003 | Kingsford |
| 6,584,569 B2 | 6/2003 | Reshef |
| 6,631,473 B2 | 10/2003 | Townsend |
| 6,839,850 B1 | 1/2005 | Campbell et al. |
| 6,996,845 B1 * | 2/2006 | Hurst et al. ............ 726/25 |
| 7,360,092 B1 | 4/2008 | Peterson et al. |
| 2002/0010855 A1 * | 1/2002 | Reshef et al. ............ 713/164 |
| 2002/0023122 A1 | 2/2002 | Polizzi et al. |
| 2003/0233581 A1 | 12/2003 | Reshef et al. |
| 2005/0138426 A1 | 6/2005 | Styslinger |
| 2005/0188423 A1 * | 8/2005 | Motsinger et al. ............ 726/22 |
| 2005/0198099 A1 * | 9/2005 | Motsinger et al. ............ 709/200 |
| 2006/0282494 A1 * | 12/2006 | Sima et al. ............ 709/200 |
| 2007/0061877 A1 * | 3/2007 | Sima et al. ............ 726/12 |

OTHER PUBLICATIONS

Sima et al., Final Office Action dated Dec. 4, 2008, U.S. Appl. No. 11/461,766, 13 p.

Sima et al., Office Action dated Jul. 8, 2008, U.S. Appl. No. 11/461,767, 11 p.

Sima et al., Office Action dated Jan. 29, 2009, U.S. Appl. No. 11/461,767, 11 p.

Caleb et al., Office Action dated Apr. 3, 2009, U.S. Appl. No. 11/461,766, 12 p.

* cited by examiner

SYSTEM AND METHOD FOR TESTING WEB APPLICATIONS WITH RECURSIVE DISCOVERY AND ANALYSIS

CROSS-REFERENCE TO RELATED APPLICATIONS

This application for a United States Patent claims the benefit of the filing date of U.S. Provisional Application for Patent that was filed on Feb. 11, 2004 with the title of "SYSTEM AND METHOD FOR TESTING WEB APPLICATIONS WITH RECURSIVE DISCOVERY AND ANALYSIS" and assigned Ser. No. 60/543,626.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to the field of Web application testing and, more specifically, to crawl-and-attack routines for testing Web applications.

Web Application Security. The increasing sophistication and proliferation of personal computers during the past decade has dramatically increased the public's ability to access and process information. Personal computers form the backbone of nearly every business in the modern world. The growth in home use is even more phenomenal. In the United States alone, as of 2001, 54 million households had one or more personal computers, and more than 41 percent of all households were connected to the Internet [source: NTIA and ESA, U.S. Department of Commerce, using U.S. Census Bureau Current Population Survey Supplements]. By the year 2005, a projected 75 percent of all U.S. households will have a personal computer [source: Jupiter Research]. The personal computer, more than any other technological device, has created and fostered what has become known as the Information Age.

Unfortunately, the free exchange of information, so easily facilitated by personal computers over the Internet, has spawned a variety of risks for the organizations that host that information. This threat is most prevalent in interactive applications hosted on the World Wide Web and accessible by almost any personal computer located anywhere in the world.

Web applications can take many forms: an informational Web site, an intranet, an extranet, an e-commerce Web site, an exchange, a search engine, a transaction engine, or an e-business. These applications are typically linked to computer systems that contain weaknesses that can pose risks to a company. Weaknesses can exist in system architecture, system configuration, application design, implementation configuration, and operations. The risks include the possibility of incorrect calculations, damaged hardware and software, data accessed by unauthorized users, data theft or loss, misuse of the system, and disrupted business operations.

As the digital enterprise embraces the benefits of e-business, the use of Web-based technology will continue to grow. Corporations today use the Web as a way to manage their customer relationships, enhance their supply chain operations, expand into new markets, and deploy new products and services to customers and employees. However, successfully implementing the powerful benefits of Web-based technologies can be greatly impeded without a consistent approach to Web application security.

It may surprise industry outsiders to learn that hackers routinely attack almost every commercial Web site, from large consumer e-commerce sites and portals to government agencies such as NASA and the CIA. In the past, the majority of security breaches occurred at the network layer of corporate systems. Today, however, hackers are manipulating Web applications inside the corporate firewall, enabling them to access and sabotage corporate and customer data. Given even a tiny hole in a company's Web-application code, an experienced intruder armed with only a Web browser (and a little determination) can break into most commercial Web sites.

The problem is much greater than industry watchdogs realize. Many U.S. businesses do not even monitor online activities at the Web application level. This lack of security permits even attempted attacks to go unnoticed. It puts the company in a reactive security posture, in which nothing gets fixed until after the situation occurs. Reactive security could mean sacrificing sensitive data as a catalyst for policy change.

A new level of security breach has begun to occur through continuously open Internet ports (port 80 for general Web traffic and port 443 for encrypted traffic). Because these ports are open to all incoming Internet traffic from the outside, they are gateways through which hackers can access secure files and proprietary corporate and customer data. While rogue hackers make the news, there exists a much more likely threat in the form of online theft, terrorism, and espionage.

Today the hackers are one step ahead of the enterprise. While corporations rush to develop their security policies and implement even a basic security foundation, the professional hacker continues to find new ways to attack. Most hackers are using "out-of-the-box" security holes to gain escalated privileges or execute commands on a company's server. Simple misconfigurations of off-the-shelf Web applications leave gaping security vulnerabilities in an unsuspecting company's Web site.

Passwords, SSL and data-encryption, firewalls, and standard scanning programs may not be enough. Passwords can be cracked. Most encryption protects only data transmission; however, the majority of Web application data is stored in a readable form. Firewalls have openings. Scanning programs generally check networks for known vulnerabilities on standard servers and applications, not proprietary applications and custom Web pages and scripts.

Programmers typically don't develop Web applications with security in mind. What's more, most companies continue to outsource the majority of their Web site or Web application development using third-party development resources. Whether these development groups are individuals or consultancies, the fact is that most programmers are focused on the "feature and function" side of the development plan and assume that security is embedded into the coding practices. However, these third-party development resources typically do not have even core security expertise. They also have certain objectives, such as rapid development schedules, that do not lend themselves to the security scrutiny required to implement a "safe solution."

Manipulating a Web application is simple. It is often relatively easy for a hacker to find and change hidden fields that indicate a product price. Using a similar technique, a hacker can also change the parameters of a Common Gateway Interface (CGI) script to search for a password file instead of a product price. If some components of a Web application are not integrated and configured correctly, such as search functionality, the site could be subject to buffer-overflow attacks that could grant a hacker access to administrative pages. Today's Web-application coding practices largely ignore some of the most basic security measures required to keep a company and its data safe from unauthorized access.

Security Threats. Developers and security professionals must be able to detect holes in both standard and proprietary applications. They can then evaluate the severity of the security holes and propose prioritized solutions, enabling an organization to protect existing applications and implement new software quickly. A typical process involves evaluating all applications on Web-connected devices, examining each line of application logic for existing and potential security vulnerabilities.

A Web application attack typically involves five phases: port scans for default pages, information gathering about server type and application logic, systematic testing of application functions, planning the attack, and launching the attack. The results of the attack could be lost data, content manipulation, or even theft and loss of customers.

A hacker can employ numerous techniques to exploit a Web application. Some examples include parameter manipulation, forced parameters, cookie tampering, common file queries, use of known exploits, directory enumeration, Web server testing, link traversal, path truncation, session hijacking, hidden Web paths, Java applet reverse engineering, backup checking, extension checking, parameter passing, cross-site scripting, and SQL injection.

Figure 1:
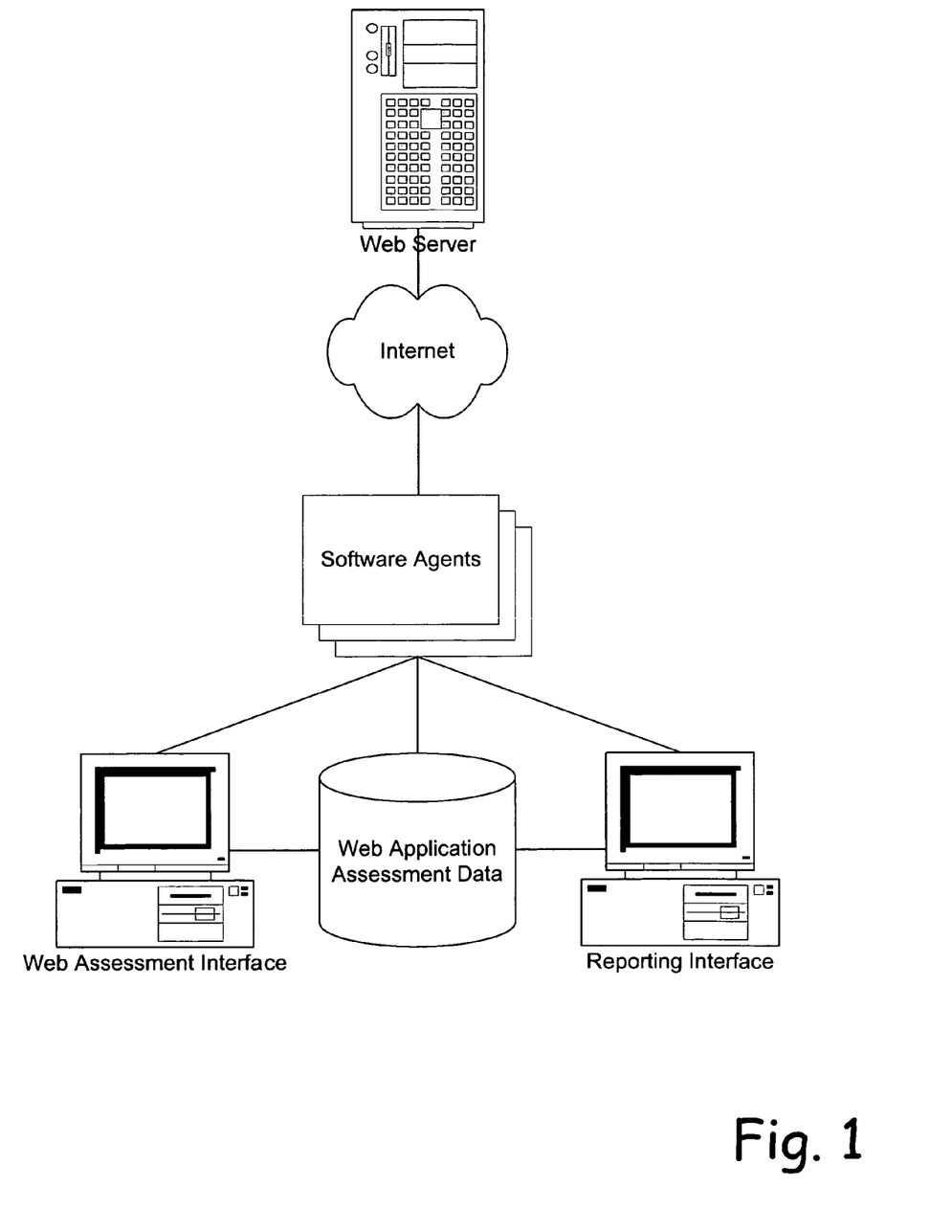
FIG. 1 is a block diagram of an example Web application assessment tool.

Security Tools. Web application assessment tools provide a detailed analysis of Web application vulnerabilities. An example Web application assessment tool is shown in FIG. 1. Through the Web Assessment Interface, the user designates which application or Web service to analyze. The user selects the type of assessment, which policy to use, enters the URL, and then starts the process.

The Web application assessment tool uses software agents to conduct the Web application assessment. The software agents are composed of sophisticated sets of heuristics that enable the tool to apply intelligent application-level vulnerability checks and to accurately identify security issues while minimizing false positives. The tool begins the crawl phase of the application using software agents to dynamically catalog all areas. As these agents complete their assessment, findings are reported back to the main security engine to analyze the results. The tool then launches other software agents during the audit phase that evaluate the gathered information and apply attack algorithms to determine the presence and severity of vulnerabilities. The tool then correlates the results and presents them in an easy to understand format.

However, Web sites that extend beyond the rudimentary level of complexity that simply includes HTML that can be rendered by a browser, can include a variety of sophisticated elements such as JAVA code, applets, Web applications, etc. The traditional approach of crawling through the HTML of a Web site is limited in the amount of information that can be obtained and analyzed. For instance, a Web site may include a PDF file that includes, within the text of the PDF file, additional links. The traditional Web crawler technology may obtain the link to the PDF file during the crawling phase of the attack, but the links embedded within the PDF file would be ignored during the second phase of the attack. Thus, there is a need in the art for a solution that can provider a deeper reach into the content of a Web site and provide a further and more in depth analysis of the vulnerabilities of the Web site.

SUMMARY OF THE INVENTION

In general, the present invention includes a system and method for testing web applications and web-based objects to identify vulnerabilities, weaknesses, erroneous operations or problems associated with the web application or web-based objects. Advantageously, the present invention incorporates a recursive crawler-analyzer that allows for a more thorough analysis to be performed on target web application or object.

In one embodiment of the invention, a target address, URL or web application is provided as the seed for the analysis. The provided seed is crawled to identify any links, forms, web pages, etc. that are present at the target address. Each of these identified web objects are then placed into a table. Further, each identified web object can be exercised against the target address, URL or web application to identify the response obtained by such exercise. Then attack sequences incorporating the web objects and response can be made against the target address, URL or web application. If during the attack additional web objects are identified, these objects are also subjected to the crawl process. Thus, a recursive model to deeply penetrating the test target is provided.

DESCRIPTION OF THE INVENTION

Now turning to the figures in which like labels represent like elements through out the diagrams, various aspects and features of the present invention are further described.

Figure 2:
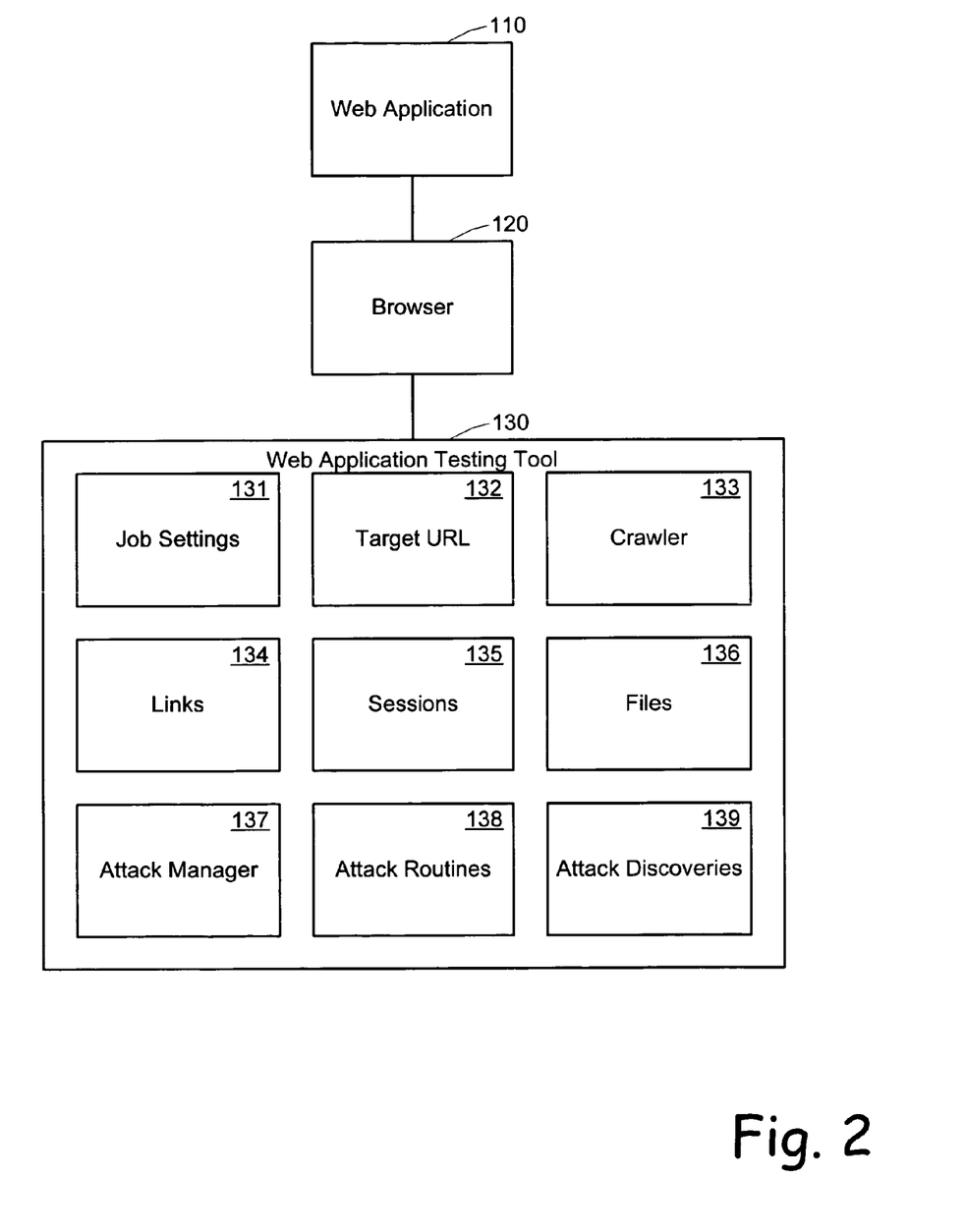
FIG. 2 is a block diagram of an example Web application crawler that searches for security-related strings in Web applications.

FIG. 2 is a block diagram illustrating and exemplary structure for a Web application testing tool that employs a recursive crawl and attack. The illustrated structure shows a Web application 110 that is being accessed or exercised through a browser 120. A Web application testing tool 130 operates through, or in conjunction with the browser 120 to test the Web application 110, or a Web site, for vulnerabilities. The Web application testing tool 130 is shown as comprising a variety of functional blocks. The illustrated embodiment does not imply that the structure of the Web testing tool 130 should be structured in this manner, but rather, the illustration is simply provided to describe the various functions that can be incorporated into the Web testing tool 130.

The Web application testing tool 130 includes a job settings function 131. The job settings function allows various aspects, parameters, operational controllers or the like to be set. These settings are then used to control the characteristic of the operation of the Web application test tool 130. For instance, the job settings could identify pages or links that are not to be examined, can identify a level of recursion not to exceed, can establish a time limit for running the test, can identify levels of detail for report generation, or the like.

A target URL 132 is entered to or identified by the Web application testing tool. This target URL is typically the starting point for the testing tool. The crawler 133 uses the information in the target URL to begin the crawling phase of the vulnerability test.

The recursive Web application testing tool includes a crawler 133 that executes one or more discovery routines on a target uniform resource locator (URL) 132, in accordance with job settings 131 for the testing session. Links 134, sessions 135, and files 136 identified in the crawl are stored for use in the attack phase. In the attack phase, an attack manager 137 employs attack routines 138 to analyze various aspects of the discovered links, sessions, and files. If the attack discovers additional links, sessions, or files, these attack discoveries 139 are passed back to the crawler for additional discovery.

More specifically, the recursive crawl-and-attack system is designed to find Web application vulnerabilities that will not be discovered by a typical Web assessment, which consists of a single crawl phase and attack phase. The crawl phase consists of the crawler 133, examining the target URL 132 to discover links 134, sessions 135, files 136, or the like on the Web site identified by the target URL 132. This phase articulates or maps the Web site. The attack phase then attacks, or analyzes, the links 134, sessions (pages) 135 and/or files 136 that were found by the crawler 133. However, the attack phase may discover sessions 135, links 134 or files 136 that were not found during the crawl phase. For example, an attack agent may find sessions hidden in the HTML comments or within files that were discovered. Because the crawl phase has already been completed, these additional links would not be evaluated by a typical Web assessment tool. The recursive method, on the other hand, will find more vulnerabilities by storing these newly found sessions and then attacking them with subsequent crawl-and-attack phases.

Figure 3:
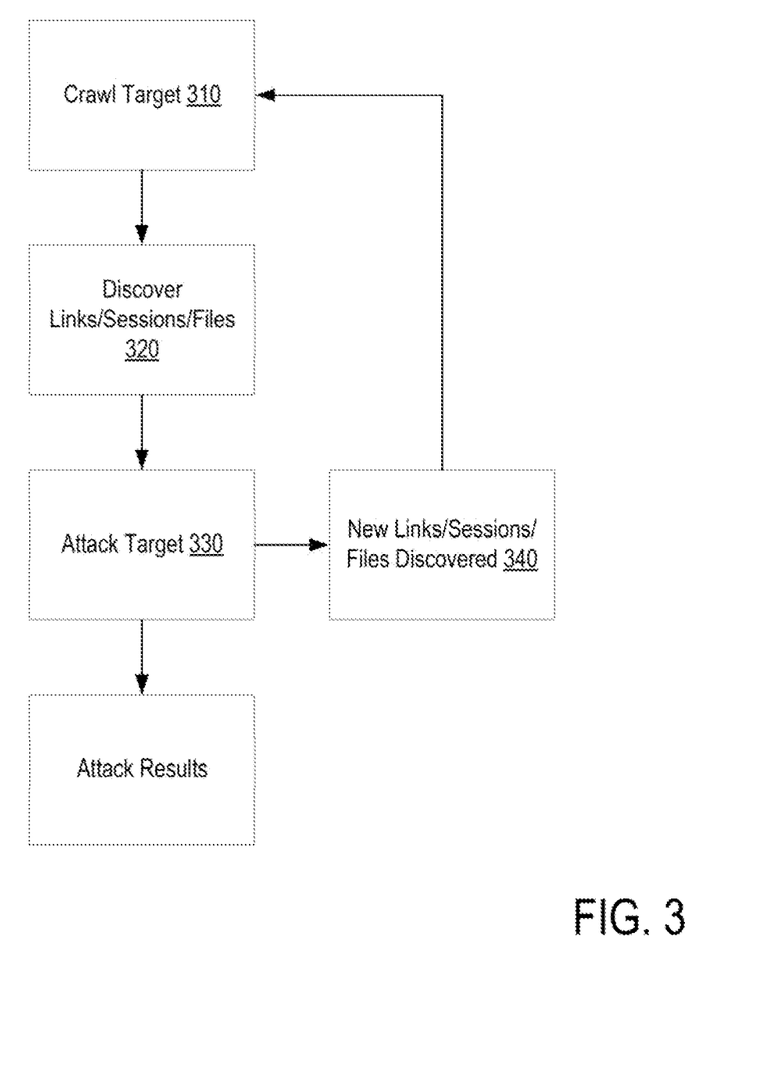
FIG. 3 is a flow diagram of an example method of searching a large buffer for multiple strings.

FIG. 3 is a flow diagram illustrating the recursive crawling and attacking aspect of the present invention. Initially a target, such as an Internet accessible URL is crawled to search through the elements on the target 310. The crawler 133 examines each element on the target to identify links, files, sessions, applications or the like that are available on the target 320. Upon identifying the links, files, sessions, application or the like, the target is then attacked 330. Once this initial crawl-and-attack phase is complete, additional links, sessions, files, applications or the like that were found during the attack phase are identified 340. These links are resubmitted to the crawling process 310 then crawled and attacked during the first recursion 320-330. If additional links are found during the first recursion, a second recursion repeats the process including steps 340, 310, 320 and 330, and so on. A large number of recursions may be required before all possible links have been discovered and assessed.

Figure 4:
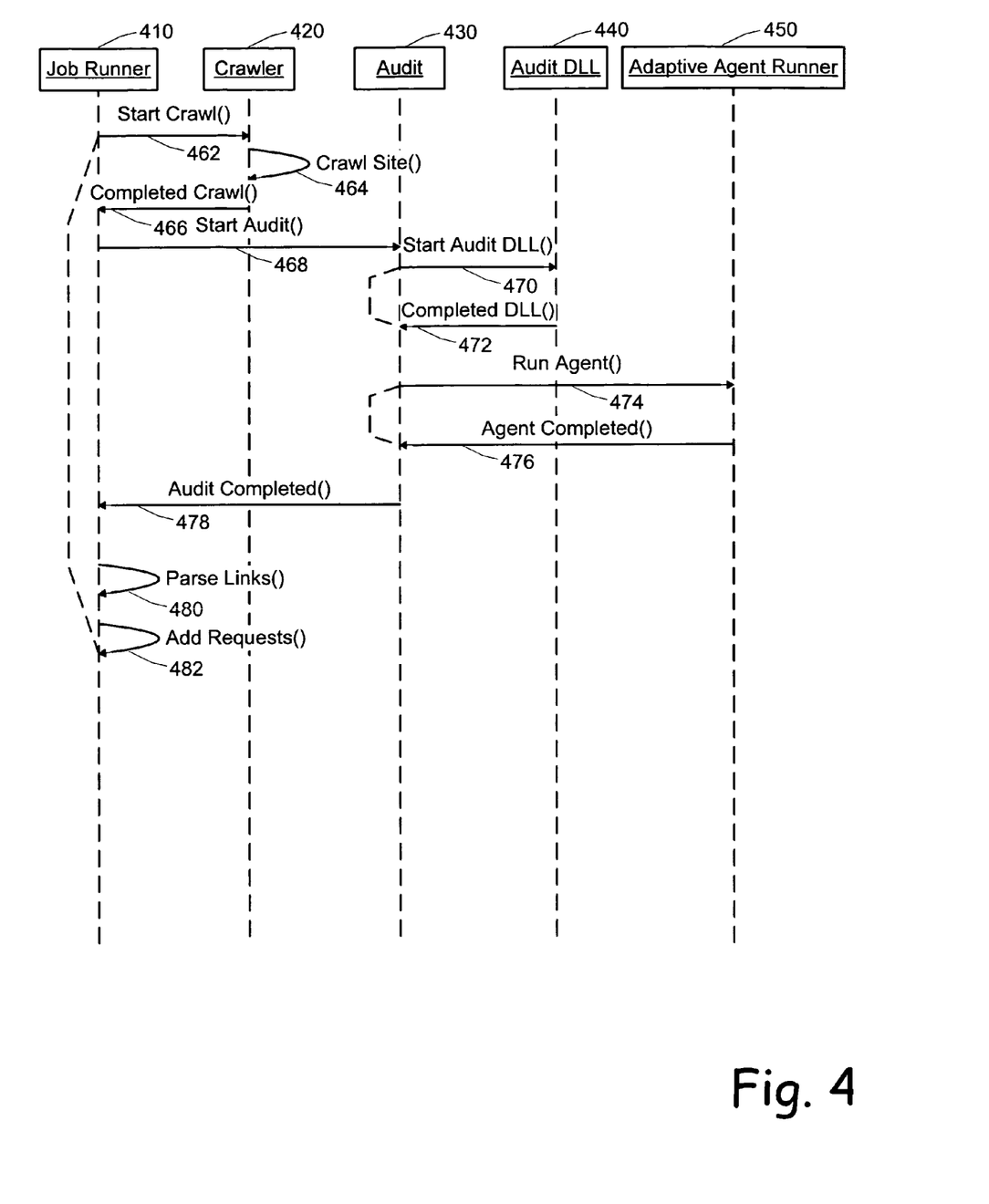
FIG. 4 is a sequence diagram of an example recursive discovery-and-analysis routine.

FIG. 4 is a sequence diagram illustrating an exemplary recursive crawl-and-attack routine. The adaptive agents include attack routines capable of discovering new links. The sequence diagram of FIG. 4 illustrates a job runner 410, a crawler 420, an audit 430, an audit DLL 440 and an adaptive agent runner 450. The job runner 410 is responsible for the job, which may actually include multiple job items.

The job runner 410 invokes the crawler 420 by executing the Start Crawl 0 routine 462. The crawler 420 then crawls the target URL by executing the Crawl Site 0 routine 464. Once the target URL is crawled, the job runner 410 is notified through a call to the Completed Crawl ( ) routine 466. The job runner 410 then begins the audit 430 of the target URL by invoking the Start Audit ( ) routine 468. The audit 430, then invokes the audit DLL 440 by calling the Start Audit DLL routine 470. The audit DLL consists of a unique attack methodology that is used to identify security vulnerabilities in the web application. Once the audit DLL 440 is completed, the audit 430 is informed through a call to the Completed DLL( ) routine 472. The Start Audit DLL routine 470 can be invoked several times depending on the number of links or elements that need to be audited.

After auditing the target, the audit 430 invokes the analysis phase controlled by the adaptive agent runner 450 by calling the Run Agent ( ) routing 474. The adaptive agent runner 450 then attempts various attacks on the link, session or file in an attempt to identify vulnerabilities. Typical attacks can include running password breaks, pushing invalid parameters at the target, or the like. When the analysis is completed, the adaptive agent runner 450 notifies the audit 430 by calling the Agent Completed ( ) routing 476.

The audit 430 then notifies the job runner 410 that the audit is completed by placing a call to the Audit Completed ( ) routine 478. As a result of the audit, additional links may be identified. The job runner 410 then parses these links by calling the Parse Links ( ) routine 480 and then adding additional requests for the process through calling the Add Requests ( ) routine 482. Using these newly added requests, the job runner 410 then continues with a second pass by once again invoking the crawler 410 through the Start Crawl ( ) routine 462. This recursive process will continue until the entire depth of the target URL has been analyzed, or until a depth identified in the job settings has been reached.

Figure 5:
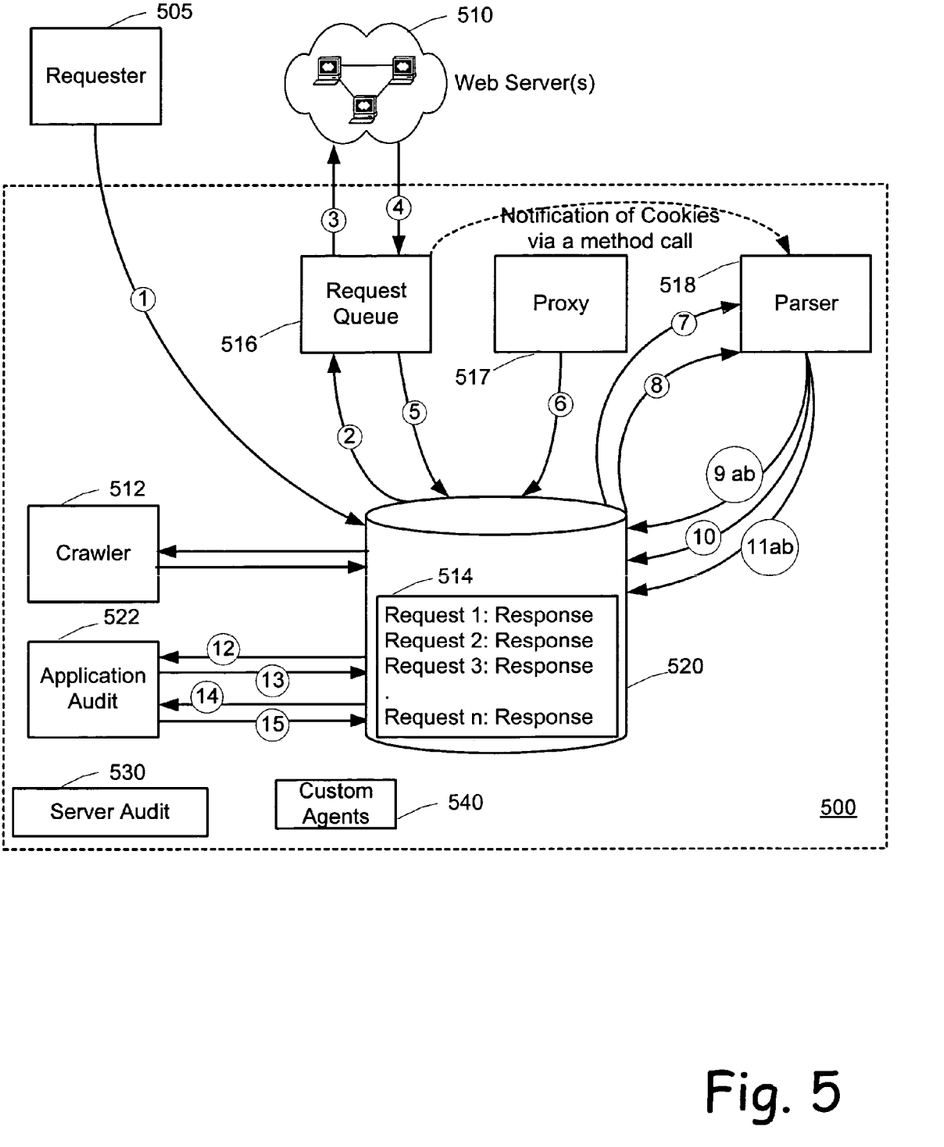
FIG. 5 is a block diagram of an example automated tool for assessing Web application security.

FIG. 5 is a block diagram illustrating the major components of an exemplary embodiment of an automated tool for analyzing Web application security and the information flow between the components. The operation of the tool will be described as including three functions: (a) Crawl/Proxy function, (b) Parse function, and (c) Application Audit function. The Web application testing tool 500 is used to examine a server or group of servers 510.

Crawl/Proxy Function:

The Engine 500 receives a "kick start" by receiving an initial seed request (1). The initial request could simply be in the form of a URL to be examined, a set of URLs, or a more specific request, such as a link to a particular portion of a web site. The seed request is loaded into a sessions table 514. The sessions table maintains a list of requests and is later populated with responses to the requests. Each such request/response pair can be viewed as a session. The loading of the initial seed request can also include inserting a 404, or page not accessible request, into the sessions table 514 to be sent to save time later. This is the random-number-based 404 check.

A crawler 512 works with the data layer 520 to further populate the sessions table 514. As previously described, the crawler 512 visits each of the addresses, URLs, links, forms, etc. that are listed in the sessions table 514 to identify other links, addresses, files, forms, etc. that need to be added to the sessions table.

A request queue 516 operates to query the sessions table 514 to obtain all unsent requests (2). The retrieved requests are then sent to the web server target 510 (3). Typically this is done in an asynchronous manner. The responses from the web server target 510 are received (4) and then saved in to a sessions table 514 as a RequestQueueSession object (5). An example of such an object would be a password field and an entry for the password field. Another example would be a response to a particular entry in a password field. A proxy 517 can also be included to interject additional entries into the sessions table 514. This could be accomplished in one embodiment by directly interfacing to the data layer 520, or in another embodiment, by interfacing to the request queue 516. In either case, the ultimate result is that the proxy 517 can insert sessions into the session table 514 that are proxied (6).

Parse Function:

The parser 518 retrieves unparsed sessions 7 and obtains cookies for a session 8 from the data layer 520. The cookies can also be obtained directly from the request queue 516. During the operation of the parser 518, if additional sessions 9a or hidden URLs as simple strings 9b are identified, they are loaded into the sessions table 514 to be used later in the process. In addition, any SetCookies are also loaded into the sessions table 514. The session is then updated with the results of the parsing 11a, including any vulnerabilities that were identified. In addition, the 404 page is updated to identify any URLs that resulted in 404 messages 11b.

Application Audit Function:

The application audit 522 obtains all sessions in the sessions table 514 that do not include 404 pages 12. During the audit function, if any 404 pages are encountered, the 404 sessions are added 13 to the Sessions Table 514 and the 404 page tables. In addition, any unaudited sessions with 404 pages are retrieved 14 and sessions are added for audit processing 15.

It should be appreciated that the operation of the crawler 512, the request queue 516, the parser 518 and the application audit can be run substantially in parallel or serially. For instance, as the sessions table 514 is being updated and populated by the crawler 512, the request queue 516 can be exercising the web server 510. In addition, the parser 518 can continuously parse the sessions to identify additional sessions and add to the sessions table 514.

Upon completion of the process, a server audit report 530 may be generated. In addition, the process can utilize custom agents 540 to perform other tasks that may be unique to a particular embodiment, web server or client.

Figure 6:
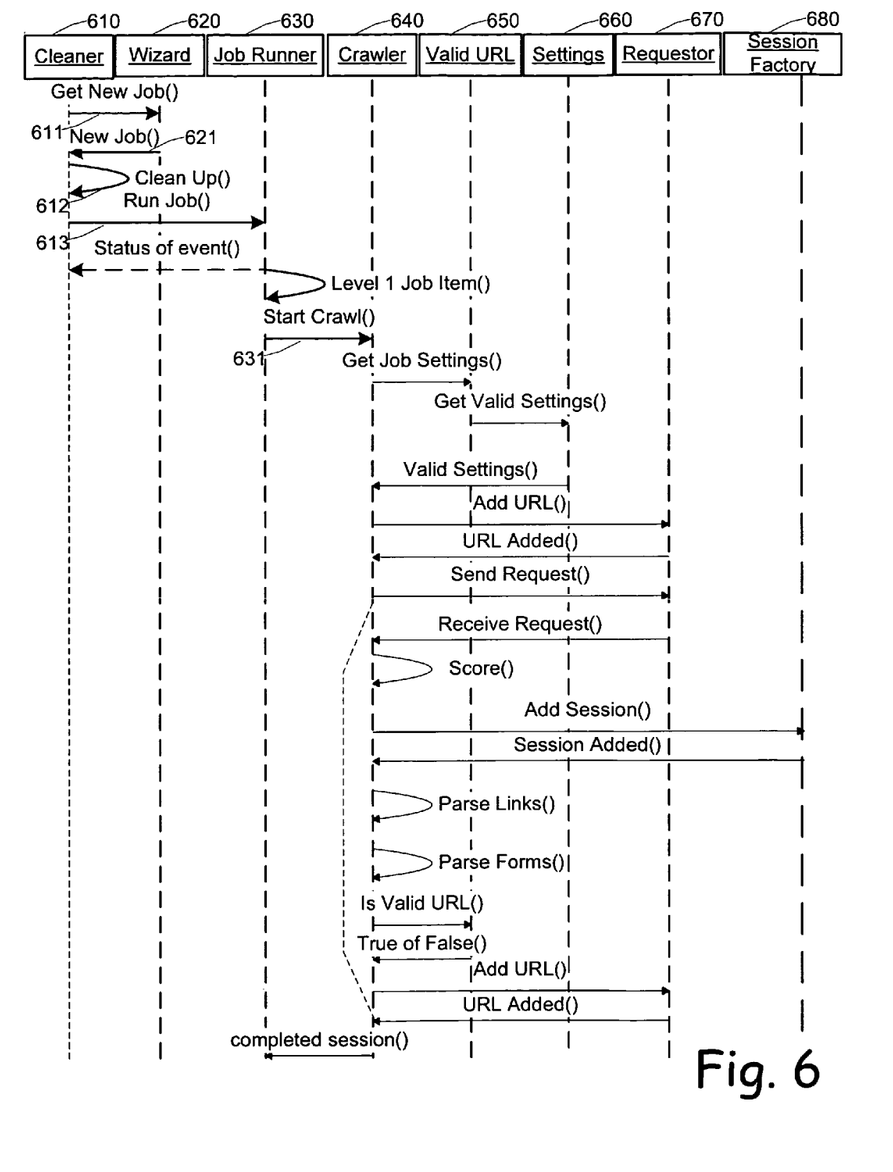
FIG. 6 is a sequence diagram of the operation of an automated tool for assessing Web application security.
Figure 7:
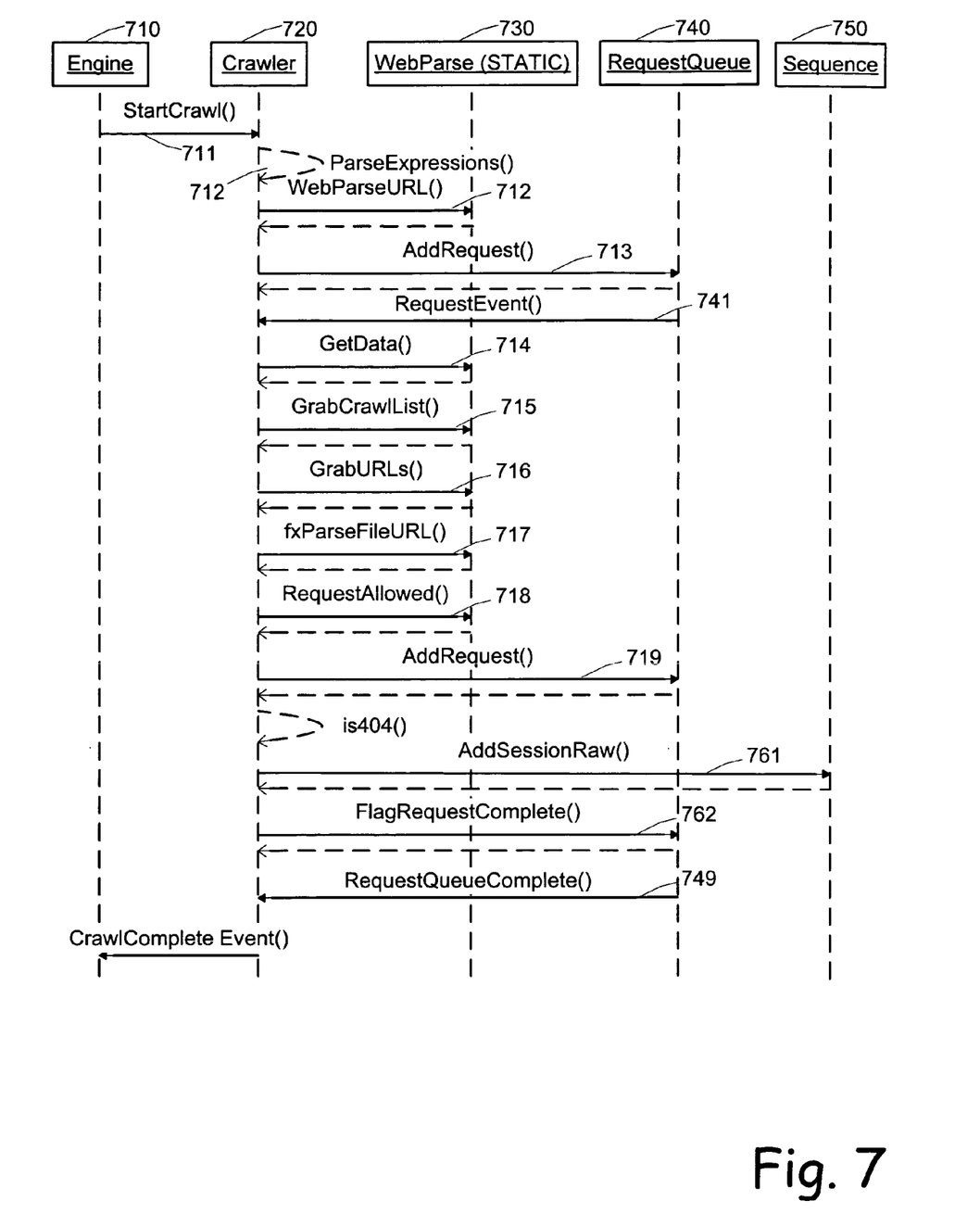
FIG. 7 is a sequence diagram of an example crawling sequence for discovery and analysis of a Web application.

The automated tool is used to discover and analyze Web applications. A sequence diagram for an example crawling process is shown in FIGS. 6 and 7. In response to a request 611 from the cleaner 610, the wizard 620 creates a job 621. A job creates one to many job items and each job item can include a settings and a policy. This process is the same regardless of whether it is being performed for Web discovery or a single URL. The cleaner 610 cleans up old jobs 612 when a new job begins and invokes the job runner 630 to run a new job 613. The job runner 630 is responsible for the job, which may actually include multiple job items. It raises events and manages them specific to the job item. When a crawl is started 631, it is passed the host and job item information. The crawler 640 obtains job settings from the valid URL 650 and requests session server types from the database. Valid URLs are kept in memory to speed up and manage what is valid and what is not. A global search is performed. A global search basically includes certain words that are searched for on every page using the multiple string search method. The valid URL request valid settings 660, and the valid settings are returned to the crawler 640. If the crawler 640 identifies an additional URL during the crawl, it is added by a call to the requestor 670 and the addition is confirmed. The crawler 640 sends requests to the requestor 670 and receives the requests from the requestor 670. The crawler 640 can then assign a score to the session. If additional sessions are identified, the crawler 640 adds the sessions by calling the session factory 680. The crawler 640 continues by parsing links and parsing forms. If potential URLs are discovered during the process, the crawler verifies they are valid through the valid URL function 650. If the URL is valid, it is passed to the requestor 670. Once the crawl is completed, it indicates this condition to the job runner 630.

Every session needs to know its parent. Add sessions checks for server, new or updated host, scheme, port, and post.

FIG. 7 shows another crawling process. An engine 710 initiates the crawl by placing a start crawl call 711 to the crawler 720. Typically, the start crawl call will pass a URL or a range of URLs to be crawled. The crawler 720 parses expressions at the URL 721 and places a call 722 to the WebParse 730 for static portions of the web site. As additional URLs are discovered, the crawler 720 passes them to the request queue 740 through call 713. Requests are sent to the crawler 741 from the request queue 740.

For each request, the crawler 720 engages the webparse function 730 to obtain data 714, obtain crawl lists 715, obtain URLS 716, to perform a parse function 717 and to indicate that requests are allowed 718. If additional links or URLs are identified during this process, they are added to the request queue 740 through call 719. If the new URLs terminate in a 404 message, the crawler 720 handles them.

Once a request is completed, the crawler 720 adds the session information into the sequence function 750 through an AddSessionRaw call 761 and then the crawler 720 notifies the request queue 740 that the request is complete by placing a FlagRequestComplete call 762. When the request queue 740 is empty, it notifies the crawler 720 749. The crawler then notifies the engine 710 that the crawl is completed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of skilled in the art. The scope of the invention is limited only by the following claims.

What is claimed is:

1. A method for testing web applications with recursive discovery and analysis comprising the steps of:
   (a) receiving a target;
   (b) crawling the target to discover a plurality of analyzable objects;
   (c) conduct attack sequences on the plurality of analyzable objects;
   (d) discovering an additional analyzable object during the attack sequence, such additional analyzable object not being readily apparent to a crawl process, and continuing at step (b) with the additional analyzable object used as an input to be used during said crawling.

2. The method of claim 1, wherein the target is a URL and the step of crawling the target further comprises parsing the HTML and objects associated with the URL.

3. The method of claim 1, wherein the target is a web application accessible at a URL, and the step of crawling the target involves examining the web application.

4. The method of claim 1, wherein the step of crawling comprises searching the target for links, sessions and files.

5. The method of claim 4, wherein the step of discovering an additional analyzable object comprises discovering an additional link, session or file.

6. The method of claim 5, further comprising the step of providing attack results.

7. A method for testing web applications with recursive discovery and analysis comprising the steps of:

(a) receiving a target;
(b) crawling the target to discover one or more analyzable objects;
(c) while crawling the target, conduct attack sequences on the one or more analyzable objects as they are discovered;
(d) discovering one or more additional analyzable objects during the attack sequences, and
(e) continuing at step (b) with each additional analyzable object used as an input to be used during said crawling.

8. The method of claim 7, further comprising a depth limit, and the step of continuing at step (b) with each additional analyzable object is restricted by the depth limit.

9. A system for testing web applications with recursive discovery and analysis, the system comprising:
a memory and a processor executing the following;
a sessions table for housing sessions;
a crawler that is operable to:
retrieve information from the sessions table;
examine one or more web items associated with the session information;
identifying additional sessions; and
entering additional sessions identified into the sessions table;
a request queue that is operable to:
extract unsent session information from the sessions table and to exercise a web application using the extracted session information; and
receive response information from the web application and enter the response information into the sessions table in a manner to associate the response with the extracted session information;
a parser operative to:
extract session information from the sessions table and search the session information to identify vulnerabilities and sessions;
and enter identified vulnerabilities and sessions into the sessions table;
and an application audit that is operable to attack the web application while the crawler is still operating by applying the session information within the sessions table and, upon discovering new sessions provide the new sessions as input to the crawler.

10. The system of claim 9, wherein the operation of the crawler and the request queue can be substantially in parallel.

11. The system of claim 9, wherein the operation of the crawler, the request queue and the parser can be substantially in parallel.

12. The system of claim 9, wherein the operation of the crawler, the request queue, the parser and the application audit can be in parallel.

13. The system of claim 9, wherein the entries into the session table initially include a request, and once the request queue has sent the request, includes any response received from sending the request.

14. The system of claim 9, wherein if the application audit identifies additional sessions, the application audit enters these additional sessions into the session table to be operated on by the crawler.

15. The system of claim 9, wherein if the application audit identifies additional sessions, the application audit enters these additional sessions into the session table to be operated on by the crawler, the request queue and the parser.

16. The system of claim 9, wherein the system includes an interface over which the system can receive an initial entry into the sessions table.

17. The system of claim 9, further comprising a proxy, wherein the proxy can enter additional sessions into the session table.

18. A method for analyzing web based objects using recursive discovery and analysis, the method comprising the steps of:
(a) receiving a web-based address of a target;
(b) crawling the target starting at the web-based address to discover one or more analyzable objects;
(c) parsing each discovered analyzable object to discover a first additional object;
(d) conduct attack sequences on each analyzable object;
(e) discovering a second additional analyzable object during the attack sequences, and continuing at step (b) with the first and second additionally discovered analyzable objects used as an input to be used during said crawling.

19. A storage device containing software that, when executed by a computer, causes the computer to:
receive a web-based address of a target;
crawl the target starting at the web-based address to discover an analyzable object;
parse said discovered analyzable object to discover a first additional object;
conduct an attack sequence on said analyzable object;
discover a second additional analyzable object during the attack sequence; and
crawl the target using the second additional analyzable object discovered during the attack sequence as input to the crawl.

* * * * *